United States Patent

[11] 3,628,000

[72] Inventor Leonard Weiss
Poughkeepsie, N.Y.
[21] Appl. No. 722,251
[22] Filed Apr. 18, 1968
[45] Patented Dec. 14, 1971
[73] Assignee International Business Machines Corporation
Armonk, N.Y.

[54] DATA HANDLING DEVICES FOR RADIX "N+2" OPERATION
6 Claims, 9 Drawing Figs.

[52] U.S. Cl. .......... 235/176, 307/209, 307/211, 307/216
[51] Int. Cl. .......... G06f 7/38, G06f 7/50
[50] Field of Search .......... 235/176; 307/209, 211, 216

[56] References Cited

UNITED STATES PATENTS

| | | | |
|---|---|---|---|
| 2,927,733 | 3/1960 | Campbell | 235/176 |
| 3,099,753 | 7/1963 | Schmookler | 235/176 X |
| 3,118,073 | 1/1964 | Walsh | 307/216 X |
| 3,148,274 | 9/1964 | Davis | 235/176 X |
| 3,277,289 | 10/1966 | Buelow et al. | 307/216 X |
| 2,700,696 | 1/1955 | Barker | 307/209 X |

OTHER REFERENCES

" Majority Logic Circuit," P. A. Gardner and M. H. Hallet, IBM Technical Disclosure Bulletin, Vol. 9, No. 11, pg. 1664–1665, April 1967

" Exclusive OR Circuit," P. W. Murphy, IBM Technical Disclosure Bulletin, Vol. 8, No. 11, pg. 1660– 1661, Apr. 1966

*Primary Examiner*—Malcolm A. Morrison
*Assistant Examiner*—James F. Gottman
*Attorney*—Sughrue, Rothwell, Mion, Zinn & Macpeak

ABSTRACT: Data-handling devices for receiving input binary information, converting the input information into internal information in a number system having a radix greater than two, and performing Boolean logic operations on this internal information to generate a binary output representing a Boolean logic function of the input signals.

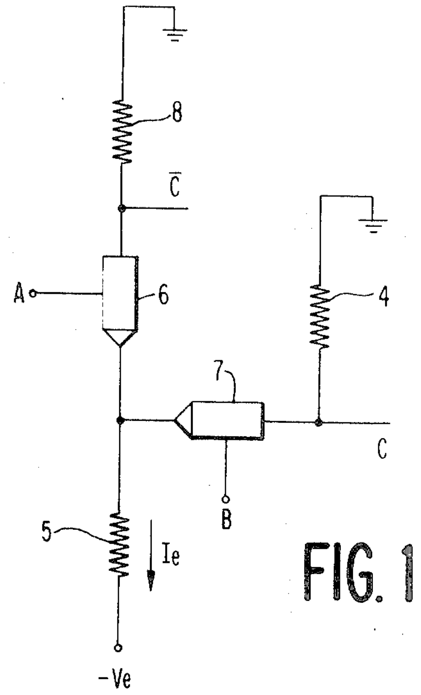
FIG. 1
| | INPUT A | INPUT B | OUTPUT $\bar{C}$ | OUTPUT C |
|---|---|---|---|---|
| 1 | + | + | − | + |
| 2 | + | 0 | − | + |
| 3 | + | − | − | + |
| 4 | 0 | + | + | − |
| 5 | 0 | 0 | − | + |
| 6 | 0 | − | − | + |
| 7 | − | + | + | − |
| 8 | − | 0 | + | − |
| 9 | − | − | − | + |
FIG. 3
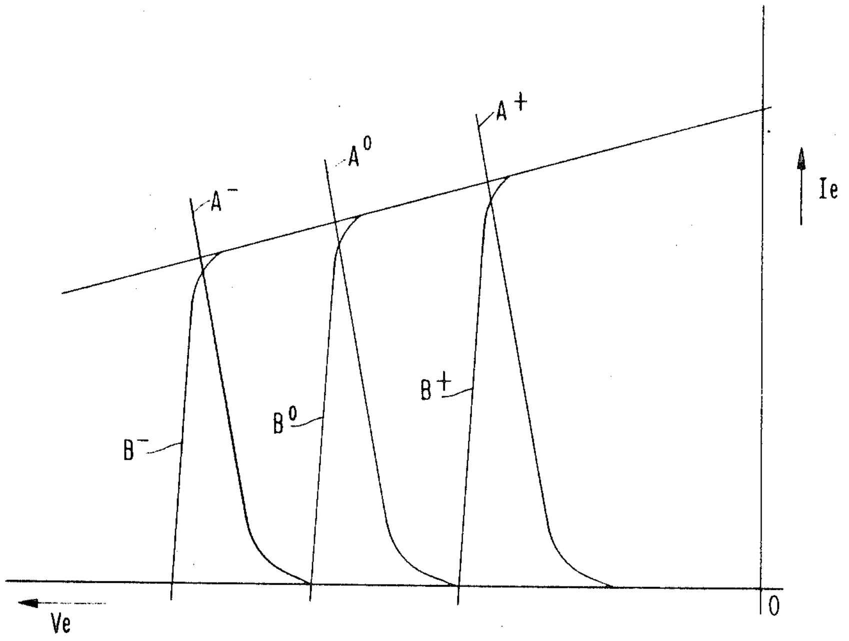
FIG. 2
INVENTOR
LEONARD WEISS
BY
Sughrue, Rothwell, Mion, Zinn & Macpeak
ATTORNEYS

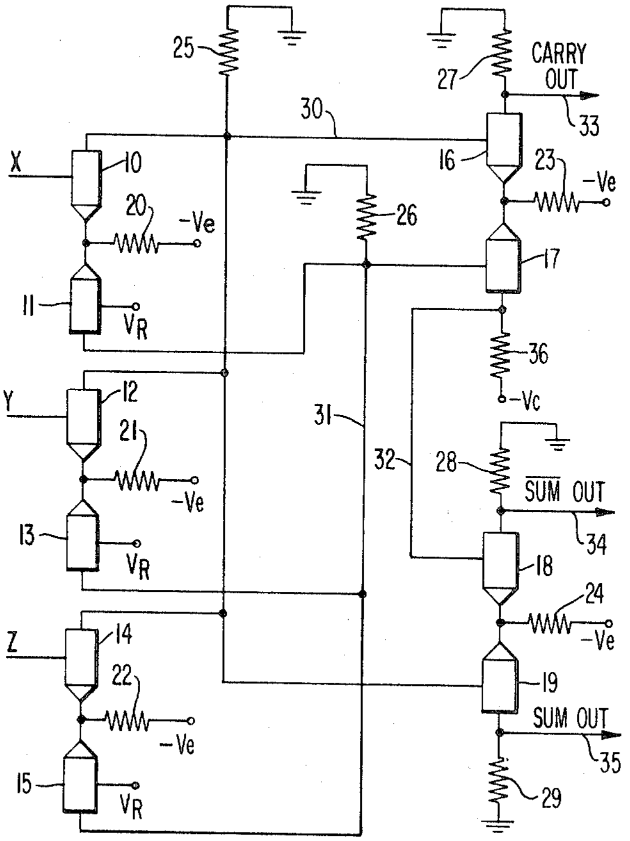
FIG. 4
| INPUT X | INPUT Y | INPUT Z | OUTPUT SUM | OUTPUT CARRY |
|---|---|---|---|---|
| + | + | + | + | + |
| + | + | − | − | + |
| + | − | + | − | + |
| + | − | − | + | − |
| − | + | + | − | + |
| − | + | − | + | − |
| − | − | + | + | − |
| − | − | − | − | − |
FIG. 6
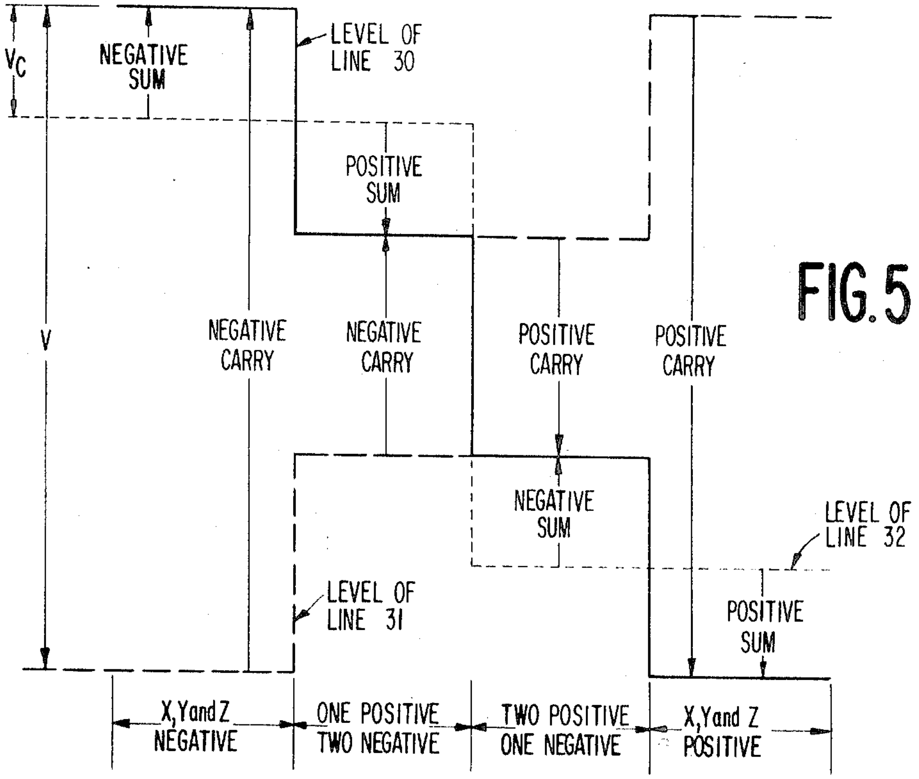
FIG. 5

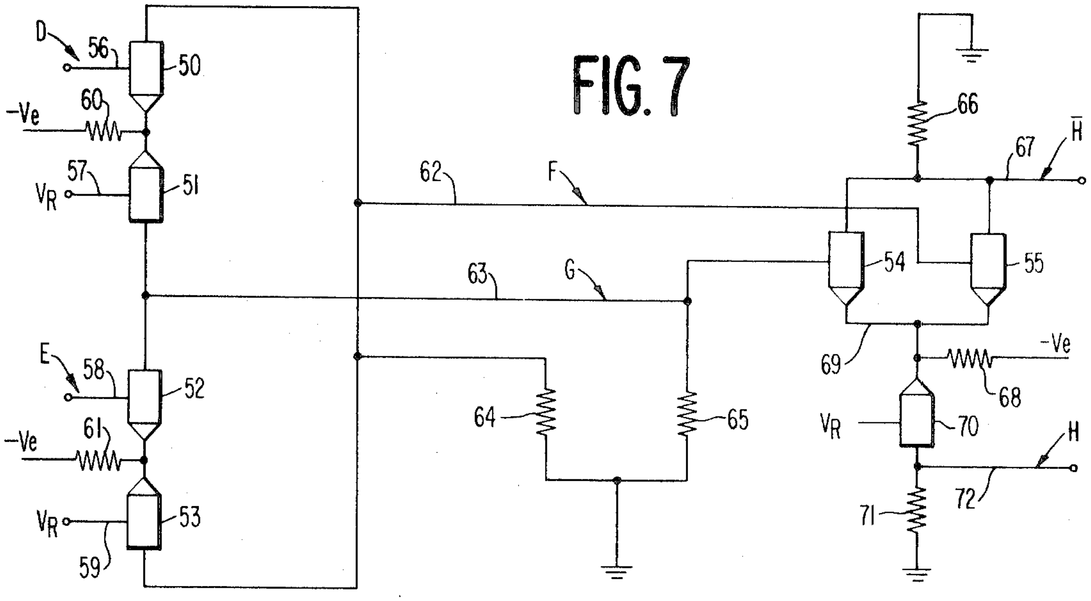
FIG. 7
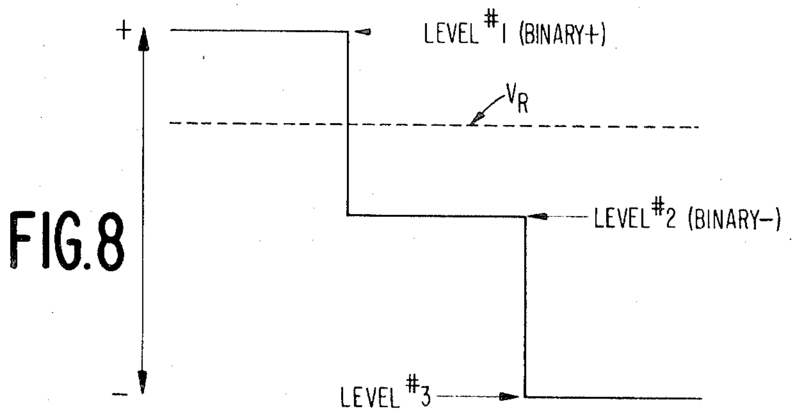
FIG. 8
| D | E | F | G | H | $\overline{H}$ |
|---|---|---|---|---|---|
| 1 ie + | 1 ie + | 2 | 2 | 2 ie – | 1 ie + |
| 1 ie + | 2 ie – | 3 | 1 | 1 ie + | 2 ie – |
| 2 ie – | 2 ie – | 2 | 2 | 2 ie – | 1 ie + |
| 2 ie – | 1 ie + | 1 | 3 | 1 ie + | 2 ie – |
FIG. 9

DATA HANDLING DEVICES FOR RADIX "N+2" OPERATION

BACKGROUND OF THE INVENTION

1. Field of the Invention

This invention relates to data-handling devices and especially to Boolean logic devices adapted to be constructed as integrated circuits for accepting binary input information, performing internal logic in a number system of radix greater than two and producing binary output information.

2. Description of the Prior Art

In the prior art, certain computers have been designed to perform radix three calculations. These computers require either that the data be recorded and transmitted in radix two or that digital to digital converters be provided for changing radices. The present invention, however, provides data-handling devices perfectly compatible with binary information systems in which the numbers having a radix greater than two are used only within the logic device itself.

SUMMARY OF THE INVENTION

The present invention concerns data-handling devices and especially Boolean combinational logic devices for receiving binary input information converting the input information into internal information in a number system having a radix greater than two, and performing logic operations on this internal information in such manner to produce an output containing only binary information representing a Boolean combination of the input information.

Such a logic device can be considered a binary element for all external purposes, since it accepts a binary input and produces a binary output. But within the device there can be a reduction in the number of active elements required because of the greater structural efficiency of using information to a higher radix.

In this specification the higher radix will be disclosed as radix three and as radix four, but still higher radices can be used. Thus, the invention is referred to as a device for radix "N+2" operation since the radix used will be some integer N added to 2. If N is 1, N+2=3 for radix three operation, etc. In particular, integrated circuit logic devices are capable of using these still higher radices "N" because the effects of temperature changes and of deviation from the design norm on such components as resistors tend to be self-cancelling in an initially properly designed integrated logic circuit.

BRIEF DESCRIPTION OF THE DRAWING

FIG. 1 is a circuit diagram of a current switch circuit used with the illustrated embodiments of the invention.

FIG. 2 is a graph showing the operation of the circuit of FIG. 1.

FIG. 3 is a table showing the results of the logic operations performed by the circuit of FIG. 1.

FIG. 4 is a circuit diagram of a circuit useful as a majority logic circuit or as an adder, according to the present invention.

FIG. 5 is a graph showing various signal levels in the circuit of FIG. 5.

FIG. 6 is a table showing the results of the logic operations performed by the circuit of FIG. 4.

FIG. 7 is a circuit diagram of an EXCLUSIVE OR circuit according to the present invention.

FIG. 8 is a graph showing signal levels used by the circuit of FIG. 7.

FIG. 9 is a table showing the results of logic operations performed by the circuit of FIG. 7.

DESCRIPTION OF THE PREFERRED EMBODIMENTS

FIG. 1 represents an ordinary current switch circuit which can be used according to the present invention to achieve novel results. Two transistors 6 and 7, connected as a current switch, have their emitters connected through a source of constant current comprising resistor 5 and a negative bias voltage −Ve. The collector of transistor 6 is connected through resistor 8 to ground and the collector of transistor 7 is connected through resistor 4 to ground. The base of transistor 6 is adapted to be biased by a signal A, and the base of transistor 7 is adapted to be biased by a signal B. A signal C is taken from the junction of transistor 7 and resistor 4, and a signal $\overline{C}$ is taken from the junction of transistor 6 and resistor 8.

A current switch circuit as illustrated in FIG. 1 is ordinarily used with binary levels applied to one input of the switch and a fixed reference potential applied to the other input. However, the present invention shows that this limitation is not necessary. A current switch works because of the relative difference between the levels at the inputs to the device. There is no necessity that such a switch be operated by absolute differences in levels between various inputs and a ground level, for example. Switches can be used for more than two levels of signals. The maximum possible number of levels depends upon the worst case design of the switch used. This worst case design is significantly improved by the use of integrated circuits in which there is greater tracking of resistors and active elements in manufacturing tolerance and temperature variation. Thus, one embodiment of the present invention uses integrated circuits.

Three signal levels (+, 0, and −) are used in the explanation which follows. However, the polarities used are not absolute but relative. Thus, the positive signal is more positive than the zero or negative signal, and the negative signal is more negative than the zero or positive signal. However, the polarities used do not necessarily indicate anything with respect to ground level.

FIG. 2 is a graphical representation of the operation of the current switch of FIG. 1. Characteristic curves $A^-$, $A^0$ and $A^+$ are shown for three levels (−, 0, and +) of input A. Curves $B^-$, $B^0$ and $B^+$ are shown for three levels of input B. The relative levels between signals A and B are such that $A^+$ is more positive than $B^+$ which is more positive than $A^0$, etc., which may be expressed mathematically as follows: $A^+ > B^+ > A^0 > B^0 > A^- > B^-$. The intersection point for the respective A and B curves representing the existing input conditions shows the current $I_e$ caused to flow through resistor 5 to bias that resistor.

The table of FIG. 3 illustrates the resulting binary outputs C and $\overline{C}$ for three levels of signals applied to the inputs of the circuit of FIG. 1. For the purposes of the present invention this table indicates that for a two input circuit, the outputs are binary, and related to the inputs in a useful predetermined manner, although the inputs are composed of a numbering system greater than radix two.

FIG. 4 illustrates a logic device using four levels for some internal logic, but accepting binary inputs and producing binary outputs. For convenience of explanation the logic device has been illustrated as a full adder. However, the same device can also be used as a majority logic device in redundant circuit applications.

In a full adder the three input signals X, Y, and Z could represent two addends and a carry from a previous full adder stage. Then the sum output 35 and carry output 33 represent the sum and carry bits from the full adder.

In majority logic device, the three signals X, Y, and Z may represent the results of three independent, identical logic operations carried out on the same data by three separate logic devices. If the three separate logic devices are all functioning correctly to produce the same output, then X, Y and Z will be identical. If one of the three separate logic devices is malfunctioning to produce an incorrect output, then two of the three values, X, Y, and Z, will be identical and the third will have a different value. Majority logic assumes that the two identical values are correct. The signal on line 33 (the so-called carry signal) represents the majority value and is the primary output of the illustrated logic device when used for majority logic. The signal on line 35 (the so-called sum signal) matches the signal on line 33 when all three inputs are identical and does not match when they are not identical. Thus, by using signals 33 and 35 as inputs to an EXCLUSIVE OR gate (not illustrated), a malfunction indication could be provided.

The current switch means associated with the X input comprises transistors 10 and 11 having common emitter connections through a source of constant current comprising resistor 20 and negative bias −Ve. The collector of transistor 10 is connected to line 30 which forms a first internal node point and the collector of transistor 11 is connected to line 31 which forms a second internal node point. Lines 30 and 31 are respectively connected through resistors 25 and 26 to ground. The base of transistor 10 is connected to receive the X signal. The base of transistor 11 is connected to receive a reference signal $V_R$. $V_R$ is set to some intermediate value between the two possible values of X so that if $X>V_R$, transistor 10 conducts and transistor 11 is cut off. If $V_R>X$, transistor 11 conducts and transistor 10 is cut off.

A similar circuit for the Y input is arranged using transistors 12 and 13 and resistor 21. Another similar circuit for the Z input is arranged using transistors 14 and 15 and resistor 22.

The diagram of FIG. 5 has three lines thereon to indicate the signal levels on various lines. These lines will be referred to by the descriptive terms as follows: the solid line (level of line 30) the broken line (level of the line 31) and the dotted line (level of line 32). The conditions for existence of these lines in the relative amplitudes shown are set forth across the bottom of the figure. The leftmost portion exists for all three signals (X, Y, and Z) negative. The next portion exists for only one signal positive; the next portion exists for only two signals positive; and the rightmost portion for all three signals positive.

Referring again o FIG. 4, the passage of current through either transistor 10, 12 or 14 causes extra current to flow through resistor 25, thus lowering the voltage (i.e., increasing the negative voltage) on line 30 by one step. The passage of current through two or three of transistors 10, 12 and 14 respectively causes the voltage on line 30 to be lowered by two or three steps from its level for all negative inputs. In FIG. 5 the solid line showing the level of line 30 illustrates these steps.

Because transistors 11, 13 and 15 are always in respectively opposite conductive states to transistors 10, 12, and 14, the voltage level of line 31 becomes one step greater each time the level of line 30 becomes one step lower. The level of line 31 is caused by transistors 11, 13, and 15 regulating the current flow through resistor 26. The various levels of line 31 are illustrated by the broken line of FIG. 5.

Lines 30 and 31 can each assume any one of four levels of stability representing logic signals. Lines 30 and 31 are connected respectively to the bases of a current switch formed by transistors 16 and 17. Transistors 16 and 17 have their emitters commonly connected through a source of constant current comprising resistor 23 and negative bias −Ve. Transistor 16 has its collector connected to ground through resistor 27. Transistor 17 has its collector connected through resistor 36 to a negative bias voltage −Vc. The magnitude of Vc is typically equal to one half the magnitude of one step of the voltage change on line 30 or 31 as illustrated in FIG. 5, and is measured from ground level.

A binary "carry" output signal 33 is taken from the junction of transistor 16 and resistor 27. This carry signal will be of its more positive value when transistor 16 is cut off and of its more negative value when transistor 16 is conducting.

Transistor 16 conducts when the signal on line 30 is more positive than the signal on line 31, that is when at least two of the input signals X, Y, and Z are in their more negative states, causing the binary carry signal to be in its more negative state.

Transistor 16 is cut off when the signal on line 30 is more negative than the signal on line 31, that is when at least two of the input signals X, Y, and Z are in their more positive states, causing the binary carry signal to be in its more positive state.

There is a binary signal on line 32 which is represented by the dotted line on FIG. 5, and which has a more negative and a more positive level. When the carry signal (line 33) is positive, this binary signal (line 32) is at its more negative level and ivce versa. The magnitude of the line 32 signal is such that it is always either approximately halfway between the first and second levels of the line 30 signal or approximately halfway between the third and fourth levels of the line 30 signal.

An examination of the vice of FIG. 4 shows that the line 32 signal is always at its more positive level when the line 30 signal is at either of its two most positive levels, and the line 32 signal is always at its more negative level when the line 30 signal is at either of its two most negative levels.

Line 32 is connected to the base of transistor 18 and line 30 is connected to the base of transistor 19 with the emitters of transistors 18 and 19 connected together through a source of constant current comprising resistor 24 and the negative bias −Ve, thereby forming a current switch. The collectors of transistors 18 and 19 are connected respectively through resistors 28 and 29 to ground. Outputs from transistors 18 and 19 are provided on lines 34 and 35.

When the level of line 32 is more positive than the level of line 30, the output on line 35 is at its more positive level and the output on line 34 is at its more negative level. When the level of line 30 is more positive than the level of line 32, the output on line 35 is at its more negative level and the output on line 34 is at its more positive level.

Thus, there is a binary output on lines 33, 34 and 35. FIG. 6 is a truth table showing the relation between X, Y and Z inputs and the outputs on lines 35 and 33.

FIG. 7 illustrates a logic device using three levels for internal logic, but accepting binary inputs and producing binary outputs. The logic device of FIG. 7 is an EXCLUSIVE OR logic circuit.

Two binary input signals D and E are applied to the circuit on lines 56 and 58 respectively. A reference signal $V_R$, having a magnitude approximately halfway between the binary signal levels of the input signals, is applied to lines 57 and 59.

The current switch means associated with the D input comprises transistors 50 and 51 having common emitter connections through a source FIGURE constant current comprising resistor 60 and negative bias −Ve. FIGURE collector of transistor 50 is connected to line 62 which forms a first internal node point, and the collector of transistor 51 is connected to line 63 which forms a second internal node point. Lines 62 and 63 are respectively connected through resistors 64 and 65 to ground. The base of transistor 50 is connected to receive the D signal. The base of transistor 51 is connected to receive the reference signal $V_R$. If $D>V_R$, transistor 50 conducts and transistor 51 is cut off. If $V_R>D$, transistor 51 conducts and transistor 50 is cut off.

A similar circuit for the E input is arranged using transistors 52 and 53 and resistor 61.

The diagram of FIG. 8 has three signal levels illustrated thereon, from the most positive level at the top of the Figure to the most negative level at the bottom of the FIG. The levels, 1, 2 and 3 plus a reference level $V_R$ are illustrated. Level 1 corresponds to the more positive binary level of the input or output signal. Level 2 corresponds to the more negative binary level of the input or output signal. Level 3 does not correspond to and is more negative than either binary signal. The level of reference voltage $V_R$ is intermediate in value to the two binary levels.

The voltage level F on line 62 is at its highest level, that is level 1 (approximately ground level), when both transistors 50 and 53 are cut off, that is when $V_R>D$ and $E>V_R$. This occurs for D at level 2 and E at level 1. For the same input conditions, the voltage level G on line 63 is at its lowest level, that is level 3.

These conditions are set forth on the first four columns of the bottom line of the table in FIG. 9. FIG. 9 also shows the levels of signals F and G for the other three possible combinations of binary input signals. Notice that signals F and G are at the same level when the binary input signals D and E are equal and that signals F and G are at different levels when the binary input signals are not equal.

Two transistors 54 and 55 are connected in parallel with common collector connection through resistor 66 to ground and with common emitter connection through a source of constant current comprising resistor 58 and negative bias voltage −Ve. Another transistor 70 has its emitter also connected through the resistor 58 to the negative bias voltage −Ve thereby forming a current switch. The collector of transistor 70 is connected through a resistor 71 to ground.

Transistor 70 has its base biased at the reference voltage $V_R$. The bases of transistors 54 and 55 are respectively biased by signal G from line 63 and by signal F from line 62.

An output signal H is taken from line 72 at the junction of the collector of switch 70 and resistor 71. Another output signal $\overline{H}$ is taken from line 67 at the junction of the collectors of switches 54 and 55 and resistor 66.

If $V_R$ is more positive than either signal F or signal G, then transistor switch 70 will conduct and transistors 54 and 55 will be cut off. But if either signal F or signal G is more positive than $V_R$ then the more positively biased one of transistors 54 and 55 will conduct, cutting off transistor 70. Thus if $V_R>F$ and $V_R>G$ then H is at level 2 and $\overline{H}$ is at level 1. Thus, the circuit of FIG. 7 operates as an EXCLUSIVE OR circuit.

Although this invention has been illustrated using NPN-transistors, it would now be obvious to a skilled artisan to use PNP-devices if such were found desirable. The invention has been illustrated for specific logic circuits but the concept of using an internal number system greater than radix two has wider application. The scope of the invention can only be defined by the scope of the claims.

While the invention has been particularly shown and described with reference to a preferred embodiment thereof, it will be understood by those skilled in the art that various changes in form and details may be made therein without departing from the spirit and scope of the invention.

What is claimed is:

1. A data-handling element comprising:

a. a plurality of switch means, b. input means for accepting a plurality of parallel binary input signals and for operating said plurality of switch means in response thereto, each one of said switch means coupled to a different one of said input signals, said plurality of switch means each having a first and second output, c. a first internal node means arranged to be switched to each one of at least three predetermined levels of stability in response to the levels of said parallel binary input signals, said first internal node means coupled to said first output of each of said switch means, d. a second internal node means arranged to be switched to each one of at least two predetermined levels of stability in response to the levels of said parallel binary input signals, said second internal node means coupled to said second output of each of said switch means, and e. output means for generating at least one binary output signal in response to the relative levels of said first and second internal node means; wherein said output means comprises first, second, third and fourth transistor means, the base of said first and second transistor means being coupled to said first and second internal node means respectively, the emitters of said first and second transistor means being connected together, the base of said third transistor means being coupled to the collector of said second transistor means, and the base of said fourth transistor means being coupled to said first internal node means.

2. A data-handling element according to claim 1 wherein said element comprises an integrated circuit device.

3. A data-handling element according to claim 1 wherein,

A. said input means is adapted to accept first, second and third parallel binary input signals, B. said first internal node means is adapted to be switched to one of four predetermined levels of stability, C. said second internal node means is adapted to be switched to one of said four predetermined levels of stability, D. said four predetermined levels of stability comprising, in order of magnitude, a first extreme level, a first intermediate level, a second intermediate level, and a second extreme level, E. said switch means causing said first and second internal node means respectively be at said first and said second extreme levels when said input signals are all at a first one of the two available binary levels and respectively to be at said second and said first extreme levels when said input signals are all at the second one of the two binary levels, and causing said first and second internal node means respectively to be at said first and said second intermediate levels when one and only one of said input signals is at said second one of the two binary levels and respectively to be at said second and said first intermediate levels when one and only one of said input signals is at said first one of the two binary levels, and F. the collector of said first transistor means being responsive to the presence of either said first extreme level or said first intermediate level on said first internal node means and the respectively corresponding presence of either said second extreme level or said second intermediate level on said second internal node means to generate a first binary output signal at said first one of said two available binary levels, said collector of said first transistor means also being responsive to the presence of either said second intermediate level or said second extreme level on said first internal node means and the respectively corresponding presence of either said first intermediate level or said first extreme level on said second internal node means to generate said first binary output signal at said second one of the two binary levels.

4. A data-handling element according to claim 3 wherein the collector of said fourth transistor is responsive to the presence of either said first extreme level or said second intermediate level on said first node means to generate a second binary output signal at said first one of said two available binary levels, said collector of said fourth transistor also being responsive to the presence of either said first intermediate level or said second extreme level on said first node means to generate said second binary output signal at said second one of said two available binary levels.

5. A data-handling element comprising:

a. a plurality of switch means, b. input means for accepting a plurality of parallel binary input signals and for operating said plurality of switch means in response thereto, each one of said switch means coupled to a different one of said input signals, said plurality of switch means each having a first and second output, c. a first internal node means arranged to be switched to each one of at least three predetermined levels of stability in response to the levels of said parallel binary input signals, said first internal node means coupled to said first output of each of said switch means, d. a second internal node means arranged to be switched to each one of at least two predetermined levels of stability in response to the levels of said parallel binary input signals, said second internal node means coupled to said second output of each of said switch means, and e. output means for generating at least one binary output signal in response to the relative levels of said first and second internal node means, wherein said output means comprises first, second, and third transistor means, the bases of said first and second transistor means being coupled to said first and second internal node means respectively, the emitters of said first, second and third transistor means being coupled to a common point and the base of said third transistor means being coupled to a reference voltage.

6. An EXCLUSIVE OR logic element according to claim 5 wherein,

A. said input means is adapted to accept first and second parallel binary input signals, B. said first internal node means is adapted to be switched to one of three predetermined levels of stability, C. said second internal node means is adapted to be switched to one of said three predetermined levels of stability, D. said three predetermined levels of stability comprising a first extreme level, an intermediate level and a second extreme level, E. said switch means causing both said first and said second internal node means to be at said intermediate level of stability when said binary input signals are at the same binary level, and causing said first and said second node means to each be at a different one of said first and said second extreme levels of stability when said first binary input signal has a different value from said second binary input signal, and, F. said output means being responsive to the presence of said intermediate levels of stability on both said first and said second internal node means for generating said binary output at a first one of the two available binary levels and being responsive to the presence of said first extreme level of stability on either of said internal node means to generate said binary output at a second one of the two available binary levels.

* * * * *

PO-1050
(5/69)

UNITED STATES PATENT OFFICE
CERTIFICATE OF CORRECTION

Patent No. 3,628,000 Dated December 14, 1971

Inventor(s) LEONARD WEISS

It is certified that error appears in the above-identified patent and that said Letters Patent are hereby corrected as shown below:

| | |
|---|---|
| Column 4, Line 7 (In the Specification Page 8, Line 10) | after "the" change "vice" to -- circuit -- |
| Column 4, Line 39 (In the Specification Page 9, Line 12) | after "source" change "FIGURE" to -- of -- |
| Column 4, Line 40 (In the Specification Page 9, Line 13) | after "-Ve" change "FIGURE" to -- the -- |

Signed and sealed this 12th day of December 1972.

(SEAL)
Attest:

EDWARD M.FLETCHER,JR.
Attesting Officer

ROBERT GOTTSCHALK
Commissioner of Patents